(12) United States Patent
Bezos et al.

(10) Patent No.: US 8,027,884 B2
(45) Date of Patent: Sep. 27, 2011

(54) CONTEXTUAL PRESENTATION ON ELECTRONIC CATALOG PAGES OF INFORMATION REFLECTIVE OF PRIOR ORDERS

(75) Inventors: Jeffrey P. Bezos, Greater Seattle, WA (US); Maryam S. Mohit, Seattle, WA (US); Walker L. Lockhart, Seattle, WA (US); Ericka N. Lock, Issaquah, WA (US); William W. Allocca, Bellevue, WA (US); Suguna Subramaniam, Bellevue, WA (US)

(73) Assignee: Amazon.com, Inc., Seattle, WA (US)

( * ) Notice: Subject to any disclaimer, the term of this patent is extended or adjusted under 35 U.S.C. 154(b) by 120 days.

(21) Appl. No.: 12/700,615

(22) Filed: Feb. 4, 2010

(65) Prior Publication Data

US 2010/0138319 A1 Jun. 3, 2010

Related U.S. Application Data

(63) Continuation of application No. 11/074,137, filed on Mar. 7, 2005, now Pat. No. 7,672,874, which is a continuation of application No. 09/900,487, filed on Jul. 6, 2001, now Pat. No. 6,917,922.

(51) Int. Cl.
*G06Q 30/00* (2006.01)
(52) U.S. Cl. ............... 705/26.61; 705/26.62; 705/26.63; 705/26.64; 705/26.7; 705/27.1; 705/27.2
(58) Field of Classification Search .................. None
See application file for complete search history.

(56) References Cited

U.S. PATENT DOCUMENTS

| | | | |
|---|---|---|---|
| 4,975,841 A | 12/1990 | Kehnemuyi et al. |
| 5,665,951 A | 9/1997 | Newman et al. |
| 5,666,493 A | 9/1997 | Wojcik et al. |
| 5,839,117 A | 11/1998 | Cameron et al. |
| 5,890,175 A | 3/1999 | Wong et al. |
| 5,905,973 A | 5/1999 | Yonezawa et al. |
| 5,960,411 A | 9/1999 | Hartman et al. |

(Continued)

FOREIGN PATENT DOCUMENTS

JP H09-163286 6/1997

(Continued)

OTHER PUBLICATIONS

U.S. Appl. No. 60/290,457 to Al-Azzawe (of-record in the parent and/or grandparent application).

(Continued)

*Primary Examiner* — M. Thein
(74) *Attorney, Agent, or Firm* — Knobbe, Martens, Olson & Bear LLP

(57) ABSTRACT

An electronic catalog system, which may be implemented as a web site or another type of interactive system, presents context-sensitive information to customers reflective of their prior orders. In one embodiment, when a customer requests an item detail page for a particular item, the system may supplement the item detail page with information reflective of one or more related orders previously placed by the customer. This information may include, for example, an indication that the customer previously ordered this item or a related item, and may include information, such as status information, regarding such previously placed order(s). If the customer previously ordered a related item, the information provided on the item detail page may include an indication of whether the previously ordered item is compatible or interoperable with the item being viewed.

18 Claims, 6 Drawing Sheets

U.S. PATENT DOCUMENTS

| | | | |
|---|---|---|---|
| 5,970,473 A | 10/1999 | Gerszberg et al. | |
| 5,970,474 A | 10/1999 | LeRoy et al. | |
| 5,970,475 A | 10/1999 | Barnes et al. | |
| 6,016,504 A | 1/2000 | Arnold et al. | |
| 6,026,375 A | 2/2000 | Hall et al. | |
| 6,026,376 A | 2/2000 | Kenney | |
| 6,129,274 A | 10/2000 | Suzuki | |
| 6,167,383 A | 12/2000 | Henson | |
| 6,484,149 B1 * | 11/2002 | Jammes et al. | 705/26.62 |
| 6,654,547 B1 | 11/2003 | Maeda et al. | |
| 7,006,988 B2 | 2/2006 | Lin et al. | |
| 7,359,871 B1 | 4/2008 | Paasche et al. | |
| 7,403,907 B1 | 7/2008 | Gerken, III et al. | |
| 7,562,032 B2 | 7/2009 | Abbosh et al. | |
| 2002/0007321 A1 | 1/2002 | Burton | |
| 2002/0042750 A1 | 4/2002 | Morrison | |
| 2002/0055878 A1 | 5/2002 | Burton et al. | |
| 2002/0077923 A1 * | 6/2002 | Siegel et al. | 705/26 |
| 2002/0099608 A1 | 7/2002 | Pons et al. | |
| 2002/0103789 A1 | 8/2002 | Turnbull et al. | |
| 2002/0133415 A1 | 9/2002 | Zarovinsky | |
| 2002/0143655 A1 | 10/2002 | Elston et al. | |
| 2002/0169656 A1 | 11/2002 | Al-Azzawe | |
| 2003/0167259 A1 | 9/2003 | Casson et al. | |
| 2003/0195876 A1 | 10/2003 | Hughes et al. | |
| 2006/0080306 A1 | 4/2006 | Land et al. | |

FOREIGN PATENT DOCUMENTS

| | | |
|---|---|---|
| JP | 2000-040181 | 2/2000 |
| WO | 97/22943 A1 | 6/1997 |
| WO | 99/09499 A1 | 2/1999 |
| WO | 00/62223 | 10/2000 |

OTHER PUBLICATIONS

Office Action issued on Nov. 15, 2007 in U.S. Appl. No. 11/073,508 (of-record in the parent application).

Office Action issued on May 20, 2008 in U.S. Appl. No. 11/073,508 (of-record in the parent application).

Description of Amazon.com purchase sharing service included in IDS dated Nov. 6, 2001 in grandparent application (of-record in the parent and/or grandparent application).

"Online Christmas sales to explode," Anonymous, Computer Dealer News: Dec. 15, 2000, 16, 26, p. 20 (of-record in the parent application).

Written Opinion from counterpart PCT application No. PCT/US02/20683 (of-record in the parent and/or grandparent application).

* cited by examiner

CONTEXTUAL PRESENTATION ON ELECTRONIC CATALOG PAGES OF INFORMATION REFLECTIVE OF PRIOR ORDERS

RELATED APPLICATIONS

This application is a continuation of U.S. application Ser. No. 11/074,137, filed Mar. 7, 2005, now U.S. Pat. No. 7,672,874 which is a continuation of U.S. application Ser. No. 09/900,487, filed Jul. 6, 2001 (now U.S. Pat. No. 6,917,922). The disclosures of the aforesaid applications are hereby incorporated by reference.

FIELD OF THE INVENTION

This invention relates to information filtering and retrieval systems. More specifically, this invention relates to data processing methods for assisting users in accessing account-specific information associated with items in an electronic catalog.

BACKGROUND OF THE INVENTION

With the increasing popularity of computer networks, it has become common for merchants to set up online stores for marketing and selling products. These stores typically include electronic catalogs that can be browsed interactively by potential customers via the Internet, an online services network, or another type of system that supports interactive browsing.

Many online stores provide services for customers to access information about their pending and past transactions. The transaction information may include, for example, descriptions of orders placed, the fulfillment status of such orders, and other details of the underlying transaction (payment method, delivery method, etc.). Typically, the online store also permits each customer to create and edit a personal profile, which may include such information as a shipping address, an email address, an electronic wish list, and information about the customer's preferences.

Customers typically may access their account information by choosing to enter an "accounts" section of the online store (e.g., by selecting a "My Account" or "My Profile" link) wherein the customers may track orders, alter contact information, change preferences, sign up for new promotions, and so forth. While an accounts section provides customers with detailed information about their accounts, accessing the accounts section while using the online store is sometimes inconvenient and disruptive of the online shopping experience. Further, the task of locating a particular transaction may be tedious and time consuming if the customer's transaction history is large.

SUMMARY

The present invention comprises computer-implemented methods for supplementing electronic catalog pages with information reflective of related orders previously placed by the user/customer. In one embodiment, when a customer accesses a portion of the electronic catalog associated with a particular subset of products (e.g., a specific product or product category), information about related orders previously placed by the customer, if any, is automatically retrieved and presented to the customer (e.g., within a web page). This information is presented without requiring the customer to access an "accounts" area (although such an area may be provided), and without requiring the customer to separately request information about the previous orders. Customers are thus presented with information about their previous orders during ordinary browsing of the electronic catalog. In addition, this information is presented in conjunction with the catalog items to which it pertains.

In one embodiment, when a customer requests a product detail page for a particular product, the item detail page may be supplemented with information reflective of one or more related orders previously placed by the customer. This information may include, for example, an indication that the customer previously ordered this product and/or a related product, and may include information regarding such previously placed order(s). If the customer previously ordered a related item, the information provided on the product's detail page may include an indication of whether the previously ordered product is compatible or interoperable with the product being viewed. Various other types of information, including order status information, may additionally or alternatively be provided.

The foregoing and other types of account-specific information may also be incorporated into other types of pages that display information about specific products. For example, when a user conducts an online search and one of the search result items is a product that was previously ordered by the customer, the search results page may be supplemented with a message indicating that the product was previously ordered. Further, some or all of the aforementioned types of account-specific information may be presented on pages dedicated to specific categories or groups of products. For instance, when a user enters an "electronics" area of the online store, a listing may be presented of orders placed for products falling within the electronics category.

The invention may be implemented within substantially any type of online store that provides interactive browsing capabilities. For example, the invention may be implemented within a web site (or group of affiliated web sites), an online services network, an interactive television system, or a system that supports interactive browsing by voice (e.g., a voiceXML based system). Further, the invention may be embodied within systems in which purchases are made at point-of-sale terminals within physical stores.

For purposes of summarizing the invention, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

DETAILED DESCRIPTION OF ILLUSTRATIVE EMBODIMENTS

I. Overview

Figure 1:
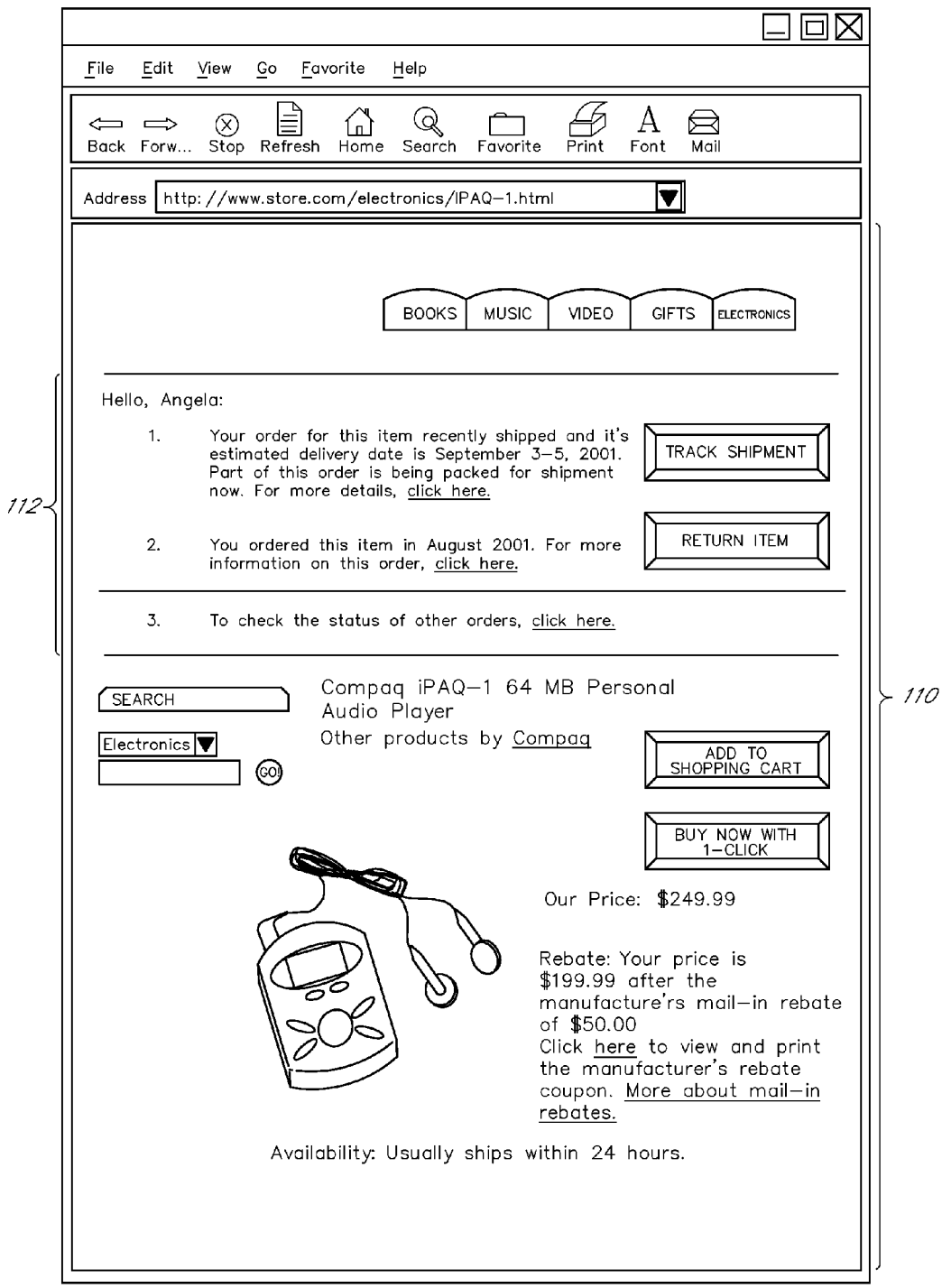
FIG. 1 illustrates one embodiment of an example product detail web page of the merchant web site.

The present invention provides a customer with context-sensitive account or account-specific information as the customer accesses a product catalog of an online merchant or store. The products may be physical products that are shipped to the customer, digital products (e.g., music files or viewable content) that are downloaded or transmitted to a customer's computing device, tickets for travel or events, services provided to the customer, or a combination thereof. The context-sensitive information presented to the customer is referred to herein generally as "inline account information."

In the embodiment illustrated in the drawings, the invention is implemented within a merchant web site system that may be accessed using a conventional web browser program. As is conventional, the merchant web site includes tools for browsing, searching, and purchasing products from the online catalog of products. In other embodiments, the invention may be embodied within a system in which customers access the catalog via an interactive television system, an online services network, a voice interface, a point-of-sale terminal within a store, wireless systems, or another type of system that supports interactive browsing. Further, the invention may be embodied within an "electronic mall" system in which the electronic catalog includes the product offerings of many different online merchants.

In the illustrated embodiment, when a customer browses or navigates to a product detail page (a page dedicated primarily to a particular product), the detail page is dynamically supplemented with inline account information about any orders that have been placed by the customer for that product. This information may include selected transaction details associated with each such order (e.g., the number of units ordered, the order date, and the fulfillment status), and/or a link to such information. The types of details displayed may, but need not, be dependent upon the status and/or the age of the order. For pending orders, the page is also preferably supplemented with controls for allowing the user to perform such actions as cancel the order or track shipment.

In addition, the detail page may optionally be supplemented with information about orders for products that are related or "similar" to the displayed product as well as "alerts" for when an order needs attention. For example, in one embodiment, when a user accesses a product detail page, a table of related products is accessed to identify any related products, and a determination is then made whether the customer has ordered any of the related products. Information is then displayed about these orders for related products.

An important benefit of displaying the order information within the catalog pages to which the order information pertains is that the customer is notified of prior purchases that may affect the customer's need or desire to order the displayed product. Unnecessary orders are thereby avoided.

Another benefit is that the customer can efficiently determine the status of an order by conducting a search for, or otherwise navigating to, the detail page for the ordered product, without having to access and navigate an "accounts" area (although an accounts area may also be provided).

In addition to displaying information about prior orders, the product detail pages may be supplemented with one or more additional types of inline account information. This information may include, for example, information about whether the displayed product (a) is on the customer's wish list, (b) was recently purchased for the customer as a gift, (c) is on the wish list of an "affiliated" customer, such as someone for whom the customer has previously purchased a gift, (d) is in stock at the customer's favorite local, physical store that has an affiliation with the online merchant. Further, the product detail pages may be supplemented with information about whether the displayed product is compatible with, interoperable with, or a substitute for a product previously purchased by that customer. For instance, as described below, a product detail page may be supplemented with a notification message such as "this laptop battery does not work with the XJ7 Laptop you recently purchased," or "you previously purchased Drug ABC, which should not be taken in combination with this medication."

Some or all of the foregoing types of inline account information may also be dynamically incorporated into other types of pages that display information about specific products. For example, when a user conducts an online search and one of the search result items is a product that was previously ordered by the customer, the search results page may be supplemented with a message indicating that the product was previously ordered. This message may also include selected transaction details as indicated above, or a link to such details. In addition, information about related orders may be incorporated into shopping cart pages (pages that display the contents of a shopping cart) and check-out pages—instead of or in addition to displaying such information in product detail pages. For instance, when one of the products represented in a customer's shopping cart was previously ordered by the customer, the shopping cart page may be supplemented with an indication that the customer previously ordered the product.

Further, some or all of the aforementioned types of information may be presented on pages that correspond or are dedicated to specific categories of products. For instance, when a user enters an "electronics" area of the online store, a listing may be presented of orders placed for products falling within the electronics category. Further, in embodiments in which the online store provides a browse tree for navigating the product offerings by category, each browse node page may be supplemented with information about orders for products falling within or below the selected browse node. Customers can thus interactively filter or categorize their account information for viewing by navigating the browse tree.

In one embodiment, the merchant's web site stores customer information in a customer database and may also utilize a temporary customer cache to store portions of the customer database, such as customer order data for customers currently interacting with the web site. After the customer first requests a web page that includes inline account information, the merchant web site may retrieve the inline account information from the customer database, incorporate the relevant portions of the information into the requested web page, and store a copy of the inline account information in the customer cache. This cache may thereafter be used to supply inline account information for other pages accessed by the customer during the same browsing session. The customer's inline account information may also be stored in the cache as soon as the customer begins a session with the merchant web site. Further, in other embodiments, the inline account information may be retrieved directly from a database on each page request, without use of a cache.

If the customer's account information is updated, the merchant web site may update the customer database and the customer cache as well. When the customer makes a subsequent request for a web page that includes inline account information, the merchant web site preferably retrieves the inline account information from the customer cache, providing fast access to the requested data without overburdening the customer database. After the customer has finished a session with the merchant web site (e.g., by logging out or not accessing any data within a time T, that is timing out), the customer's data may be flushed from the customer cache. Thus, the merchant web site provides the customer with real-time (up-to-date), inline account information and immediate responses during the customer's interaction with the merchant's web site without exhausting system resources.

To facilitate an understanding of one practical application, systems and methods for providing an inline account information service are described primarily in the context of an example system for assisting customers of a merchant web site in locating and evaluating products within an electronic catalog. The products may include, for example, book titles, music titles, digital video disc ("DVD") titles, electronics, and video titles. It is recognized, however, that the system may be used in other environments such as the marketing and sales of other types of items. For example, in other embodiments, the items may be cars sold by an online car dealer, movies titles rented by an online video store, computer programs or informational content electronically downloaded to customer computers, or stock and mutual fund shares sold to online investors. Further, it should be understood that the "purchases" referred to herein need not involve an actual transfer of ownership, but may involve leases, licenses, rentals, subscriptions, and other types of business transactions.

The merchant web site may provide various services for enabling customers to browse, search, and make purchases from the online catalog. In addition, information about existing customers of the web site may be stored in a customer database and may include profile and transaction information, such as the names, shipping addresses, email addresses, payment information, preferences, and browsing activity histories of the customers. The merchant web site may also include functionality or services for enabling customers to do one or more of the following: (a) create, and purchase products from, personal wish lists, (b) purchase products as gifts for other customers, (c) explicitly establish affiliations with other customers (e.g., for purposes of sharing purchase histories or other account information), (d) purchase products from, or arrange for delivery of items to, a local store that has an affiliation with the online merchant. Further, the merchant web site may include functionality for creating customer affiliations based on actions performed by customers. For example, when Customer A purchases a gift for Customer B, an association may automatically be formed between Customers A and B for purposes of displaying inline account information.

Various embodiments of providing inline account information will now be described in further detail. The illustrated screen displays, data structures, architectures, and processing methods used to implement the disclosed functions are largely a matter of design choice, and may be varied without departing from the scope of the invention. Accordingly, the scope of the invention is defined only by the appended claims.

II. Sample Web Pages

The following provides a brief description of a sample product detail page and a store web page. It is recognized that the inline account information may be included in a variety of other types of pages, including search results pages, browse node pages, pages with personalized lists of recommended items, shopping cart and check out pages, help pages, home pages, and gateway home pages. Further, the inline account information service may be utilized by other services of the online store such as, for example, personalization, recommendations, customer service, order forms, and other services that use customer order information to make decisions for or suggestions to customers. In addition, as mentioned above, the web site may also provide a conventional "accounts" area for accessing account information. A wide variety of web pages and/or other electronic documents may be used; thus, the sample web pages are meant only to illustrate specific embodiments of the invention.

A. Product Detail Page

FIG. 1 illustrates a sample product detail page 110 of the merchant web site. The product detail page 110 provides detailed information about a particular product. In one embodiment, each product detail page 110 typically includes a description, picture, price, customer reviews, lists of related products, and information about the product's availability. Some or all of this information is preferably retrieved from a products database when the page is rendered, although some or all of the information could be statically coded within the web page. The detail page 110 also provides an option for the user to initiate placement of an order for the product. In the illustrated embodiment, the user may initiate placement of an order either by adding the product to a shopping cart or by purchasing the product using a single action (1-Click) service.

The merchant web site is preferably arranged such that, in order to access the product detail page 110 of a product, a customer either selects a link associated with that product (e.g., from a browse node page or search results page) or submits a search query uniquely identifying the product. Thus, the customer's accessing of a product detail page 110 generally represents an affirmative request by the customer for information about that product. In some cases, a product detail page may encompass a number of variations or formats of the same product. For instance, a single product detail page may be provided for a particular book title, even though the book title may be sold in a variety of media formats (e.g., hardcover, paperback, audio tape, electronic, etc.). In one embodiment, a user must access a product's detail page in order to place an order for that product.

The exemplary product detail page 110 includes a photo of the featured product, a Compaq iPAQ Personal Audio Player, as well as the selling price, the rebate price, and availability information. The product detail page 110 also includes an example set of inline account information 112 for "Angela," a customer of the merchant web site. From the inline account information 112, Angela can see that she ordered the item in August 2001, and the item's estimated delivery date is between Sep. 3, 2001 and Sep. 5, 2001. The inline account information 112 also enables Angela to check the status of other orders as well as track the shipment of and return her Compaq iPAQ Personal Audio Player.

In one embodiment (not illustrated), the detail pages also display information about orders placed by the customer for related products. For instance, in the example of FIG. 1, if Angela had also placed an order for another personal audio player product, the web page would be further supplemented with information about that order. In yet another embodiment, information about orders for related products is displayed only if no orders have been placed for the product being viewed.

Although the product detail pages in the illustrated embodiment are browser-compatible web pages, other types of page displays may be used. For instance, in an online services network or an interactive television implementation, the product detail pages may be in the form of screens or pages in a proprietary format.

B. Store Page

Figure 2:
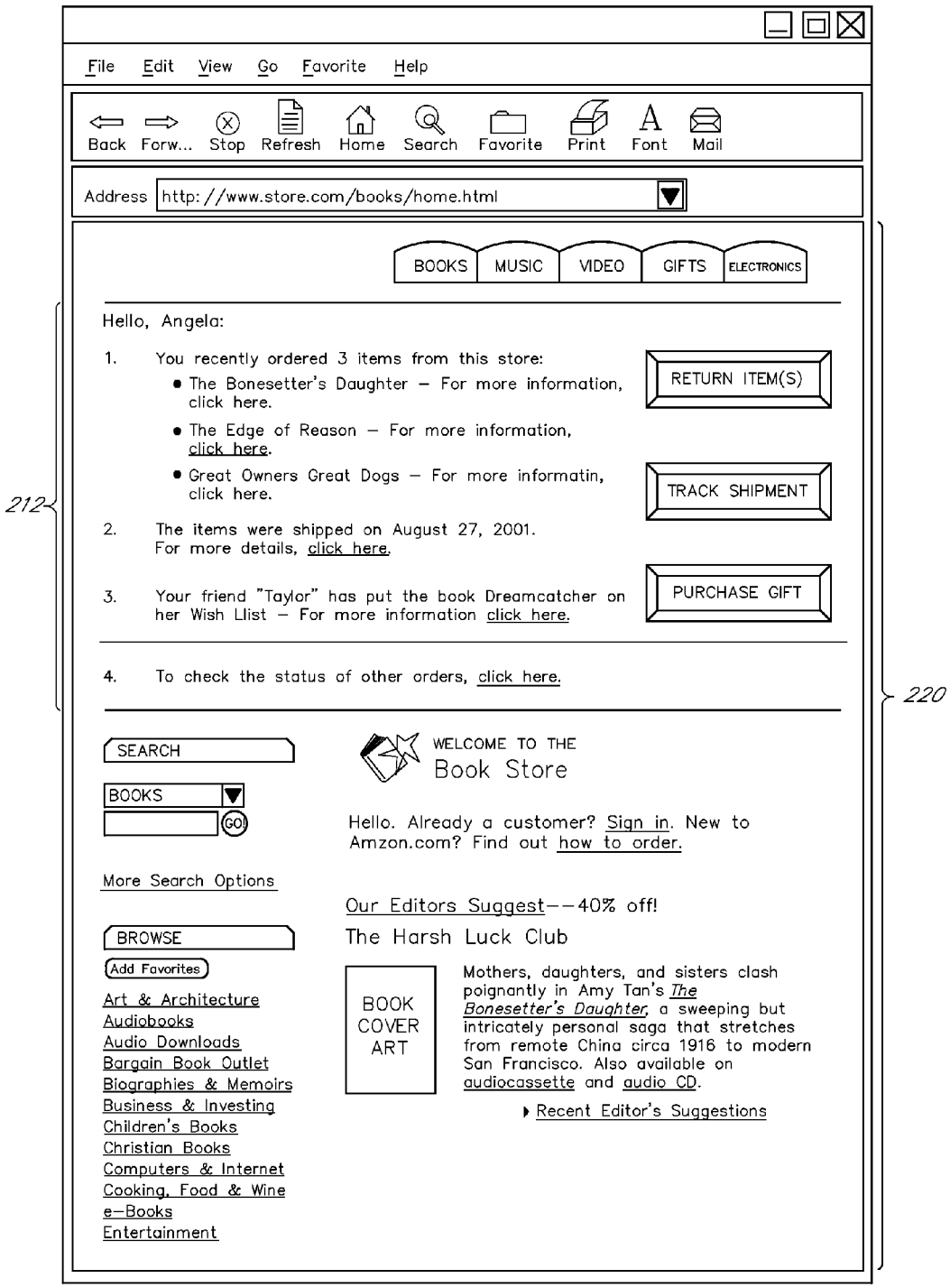
FIG. 2 illustrates one embodiment of an example store web page of the merchant web site.

FIG. 2 illustrates a sample store home web page ("store page") 220. The exemplary store page 220 includes featured products and promotions of a "Book Store" which includes browsable subject groups that relate to the store, as well as a variety of other services. Other stores corresponding to other major product categories of the merchant web site may be accessed by selecting the tabs at the top of the page. The store page 220 also includes a set of inline account information 212 for the customer "Angela." From the inline account information 212, Angela can see that she has ordered three books from the Book Store and that the items were shipped on Aug. 27, 2001. This list may be generated by filtering out from Angela's order history all orders of products that fall within other product categories (e.g., music, electronics, etc.). Angela can also see that her "friend" Taylor has put the book "Dreamcatcher" on her wish list. The inline account information 212 enables Angela to access more information on the books she ordered, view shipping details on her book orders, return one or more of the items, track shipment of the items, purchase the wish list book for Taylor, and check the status of other orders.

The store page is one type of product category page in which inline account information may be displayed in accordance with the invention. Other types of category pages include browse node pages, author pages that lists books by a particular author, artist pages that list music titles by a particular artist, and pages associated with sub-categories of products (e.g., "MP3 players").

FIGS. 1 and 2 illustrate sample sets of inline account information 112, 212, and it is recognized that other types of information may also be included. For example, the inline account information may indicate discounts available for a particular customer (or set of customers) as well as contact information for "friends" who have already purchased the product. Various systems and methods for notifying customers interested in particular products of other customers that have purchased the same or similar products are disclosed in U.S. patent application Ser. No. 09/377,322 filed Aug. 19, 1999, the disclosure of which is hereby incorporated by reference. Some additional types of inline account information are discussed below in the section entitled "Types of Inline Account Information."

The inline account information 112, 212 may be incorporated into the web pages using a variety of user interface tools, such as, for example, tables, embedded frames, static frames, pop-up windows, scrollable frames, and so forth. The web page and accompanying interface objects which include the inline account information are passed to the customer's web browser from the merchant web site.

III. System Architecture

Figure 3:
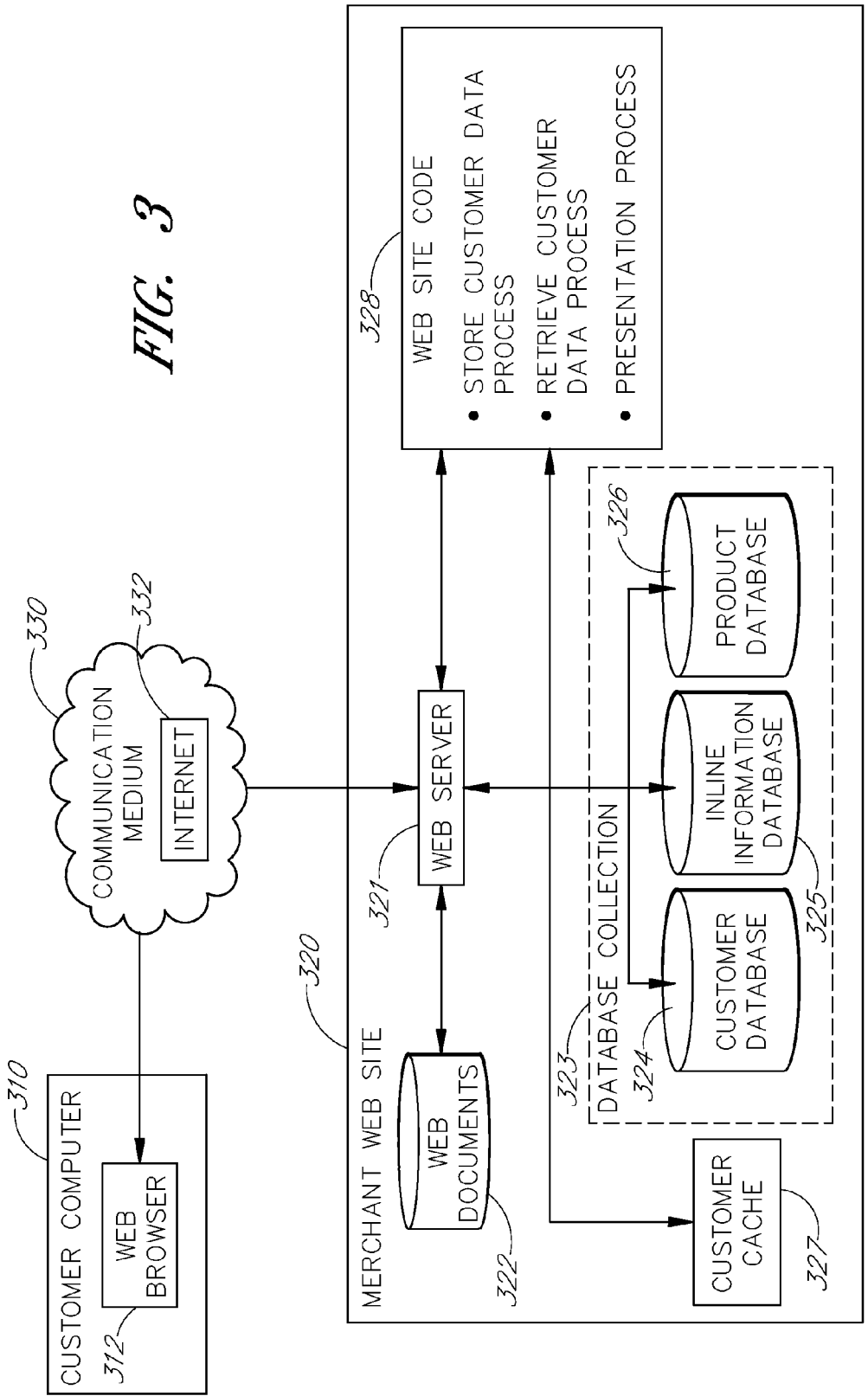
FIG. 3 illustrates a general architecture of one embodiment of an inline account information system.

FIG. 3 illustrates one embodiment of a general architecture of an electronic commerce system that provides inline account information. The system includes a customer computer 310 and a merchant web site 320 that communicate via a communication medium 330, such as the Internet 332.

A. Customer Computer

The customer computer 310 may be implemented using any type of computing device that enables a customer to interactively browse a remote web site or online catalog through the communication medium 330 using, for example, a web browser 312, such as Netscape® Navigator or Microsoft® Internet Explorer. The customer computer 310 may be, for example, an interactive television, a cellular phone, a personal digital assistant, an interactive wireless communications device, a telephone that connects with an Automated Voice Recognition ("AVR") system, a handheld computer, or the like, which interacts with the communication medium 330.

B. Merchant Web Site

The merchant web site 320 is an electronic commerce web site that provides various functionality for enabling customers to purchase products. Typically, the merchant web site 320 is operated by a business entity ("merchant") that handles the various order processing, shipping, collections, and customer service tasks associated with the sale of goods. The merchant web site 320 may identify customers using any appropriate method, such as cookie retrieval or a log-in procedure. In some embodiments, the online store may include multiple, distinct web sites or systems associated with a group of affiliated merchants FIG. 3 illustrates one embodiment of a sample merchant web site 320 that includes components that may be used to implement the above-described features. The exemplary merchant web site 320 includes a web server 321 which accesses a database of web documents and related content 322. The web documents 322 may include standard HTML documents as well as other types of documents. The web server 321 processes requests for the documents 323, retrieves the documents 323, performs any necessary processing, and sends the documents 323 to the requesting computer via the communication medium 330. The documents may be used to generate the merchant web pages, such as those illustrated in FIGS. 1 and 2, as well as a variety of documents, such as account pages, search pages, program sign-up pages, and so forth.

The merchant web site 320 also includes a database collection 323 which includes a customer database 324, an inline information database 325, and a product database 326 of product data. In addition, the merchant web site 330 may include a customer cache 327 for temporarily storing information that corresponds to customers interacting with the merchant web site 320, though use of a customer cache 327 is optional. The exemplary web site 320 includes a set of web site code 328 that interacts with the web server 321, the database collection 323, and the customer cache 327.

1. Database Collection a. Customer Database

The customer database 324 or user database stores information about existing customers of the merchant web site 320. This information, sometimes referred to as the customer's "user profile," may include the name, shipping address, e-mail address, payment information, login identifier, password, and one-click settings of the customer. The information may also include information about customers' accounts, such as order information, shipping information, payment information, cancellation information, wish list contents, shopping cart contents, information about affiliations established with other customers, and other information.

b. Inline Information Database

The inline information database 325 stores information about the inline account information to be included in the web documents. The inline information database 325 may indicate, for example, which web pages include inline information as well as the type of information that may be included in the inline information section. It is recognized that in other embodiments such information may be explicitly or implicitly specified within the web page's coding or by the location of the web page within a directory structure.

A chart indicating some of the types of information displayed according to one embodiment of the invention is included in the attached appendix, which forms part of the disclosure of the specification. The rules listed in the chart use customer and order history information to determine the type of inline account information and customized Help information, if any, to include in a web page, such as a product detail page, a category page, a browse nose page, and so forth.

The inline information database 325 may also include rules that govern the level of confidence needed before presenting information to the customer. For example, one rule may require that the customer's operating system match the "default" operating system specified in the customer's profile. Another rule may request a login/password pair from the customer. Other rules may include looking at the customer's ID in the cookie, which indicates that the customer has logged onto the web site at some time in the past, and verifying that the customer has an authentication session, that is that the customer has logged onto the site in the last X minutes where X is an integer. In other embodiments, once the customer has been authenticated, all types of inline account information may be presented without regard to levels of confidence. Further, customers may be given an option to inhibit the display of inline account information, and/or to specify the types of inline account information to be displayed.

It is recognized that, in other embodiments, part or all of the data in the inline information database 325 may be stored in other locations. For example, information as to which web pages may include inline information may be stored as part of the database of web documents 322, and rules relating to levels of confidence may be stored in the customer database 324.

c. Product Database

The product database 326 stores information about the various products that customers may purchase through the merchant web site 320. This information may include, for example, the titles, authors, publishers, subject descriptions, and ISBNs (International Standard Book Numbers) of book titles, and the titles, artists, labels, and music classifications of music titles. The information for each item is arranged within fields, such as an "author" field, a "title" field, a "general book" field, enabling the product database 326 to be searched on a field-restricted basis. The product database 326 may consist of two or more separate databases.

The various product offerings may be arranged within a browse tree in which each node represents a category/group or subcategory/subgroup of products. Browse nodes at the same level of the tree need not be mutually exclusive.

d. Alternative Implementations

In connection with the database collection 323, in one embodiment, there may be several processes (not shown) such as ID generators, number generators, statistic generators, session generators, and temporary storage units that work with the database collection 323.

Furthermore, it is recognized that the database collection may be implemented using a variety of different databases such as relational databases, flat file databases, or object-oriented databases. Moreover, while the database collection 323 shown in FIG. 3 is comprised of several separate databases, it is recognized that in other embodiments, the database collection 323 may include other databases and/or that two or more of the databases may be combined. In addition, the database collection 323 may be implemented as a single database with separate tables or as other data structures that are well known in the art such as linked lists, stacks, binary trees, and so forth.

2. Customer Cache

The customer cache 327 illustrated in FIG. 3 stores information about customers interacting with the merchant web site 320. In one embodiment, the customer cache 327 stores order-related data or raw data relating to the customers, such as, for example, items purchased, shipment information, discounts, payment methods, shipping address, gift wrapping services, message services, shipping fees, as well as other information related to a given order.

The customer cache 327 may be implemented in a variety of technology, such as, for example, polling technology or publish-subscribe technology. By using publish-subscribe technology, one server may "publish" data to a server and/or the customer cache 327 and then notify the subscribing servers and/or customer caches 327 that the data has been published. Publish-subscribe technology may be used to enable event-driven cache updates and to permit communication among multiple servers. For example, publish-subscribe technology may be used to initiate the loading of the cache with one customer's data such that while one server is displaying a web page to the customer, the load request may be published to another server.

The customer cache 327 may be implemented using a high-speed storage mechanism, such as a static RAM device, a dynamic RAM device, an internal cache, a disk cache, as well as a variety of other types of storage devices. Typically, data is accessed from a cache faster than the time it takes to access a database stored in a mass storage system. The customer cache 327 stores data such that if the merchant web site 320 needs to access customer data from the customer database 324, the customer cache 327 may be checked first to see if the data is available. Thus, use of the customer cache 327 may improve the merchant web site's performance in providing inline account information to customers.

In one embodiment, a session begins when a customer enters the merchant web site 320. If the customer is recognized, the web server 321 retrieves the customer's corresponding data from the customer database 324 and places a copy in the customer cache 327 for N minutes or seconds, where in N is a number. N may be adjusted or reset if the customer stays on the merchant web site 320 longer or if other applications of the merchant web site 320 request access to the data stored in the customer cache 327. For example, N may be set to P, wherein P equals the length of time the customer has been in the merchant web site 320 (as known in real-time) multiplied by a fixed number X making P easily configurable.

It is recognized that in other embodiments, P may be of various lengths, such as, for example, predetermined times (e.g., ½ hour, 1 hour, 2 hours, etc.) or varying times that depend on a variety of factors such as particular customer, web site traffic, time of day, and so forth.

Unrecognized or unregistered customers may be assigned temporary IDs such that the merchant web site 320 may track activity of the customers.

3. Web Site Code

The web site code 328 illustrated in FIG. 3 includes a store customer data process, a retrieve customer data process, and a presentation process. For more information on the processes, please refer to the section below entitled Merchant Web Site Processes.

D. Communication Medium

The presently preferred communication medium 330 includes the Internet 332, though a wide range of communication mediums may be employed.

IV. Merchant Web Site Processes

A. Store Data Process

Figure 4:
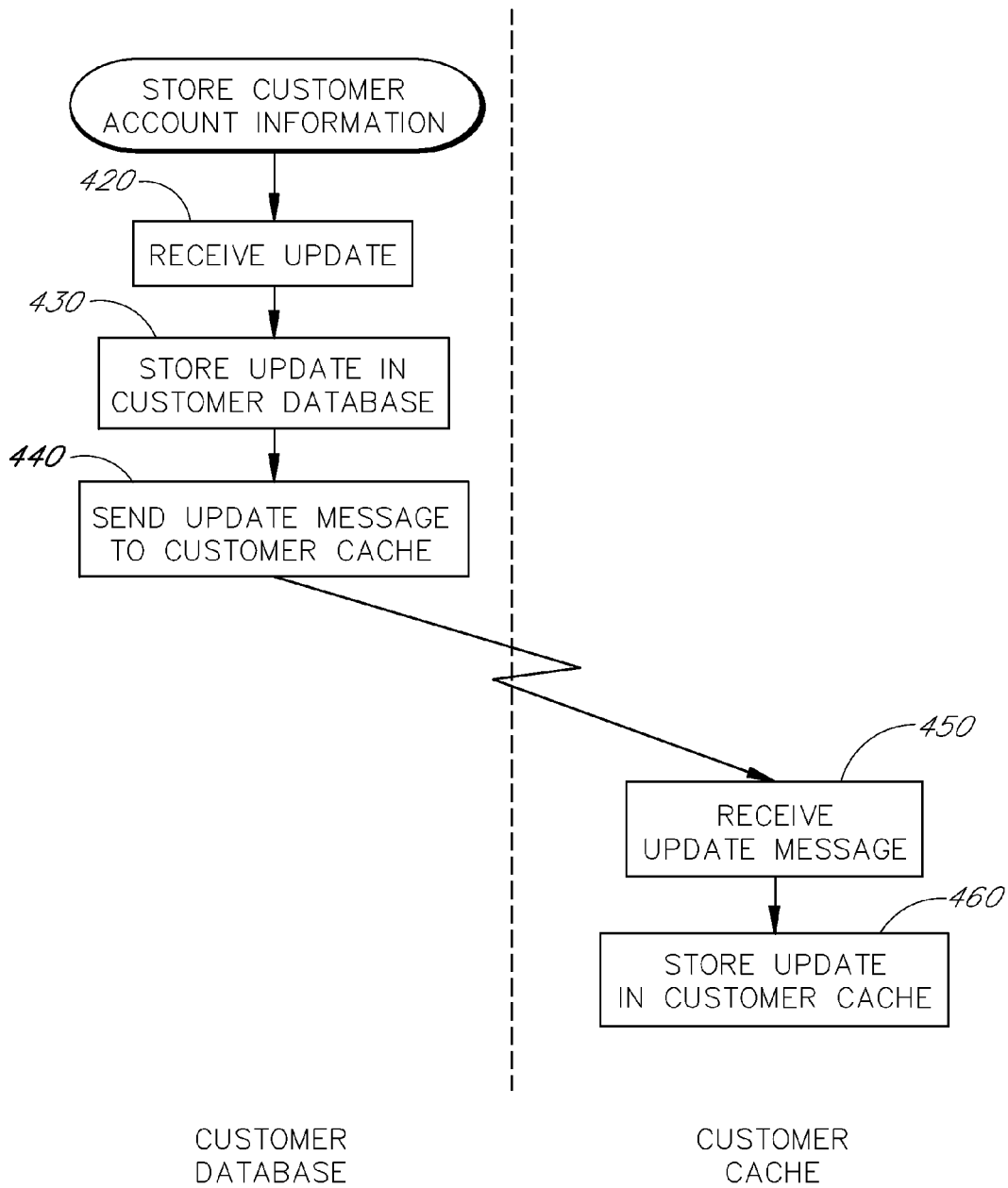
FIG. 4 illustrates a flow diagram of one embodiment of a store customer account information process.

One embodiment of the store customer data process ("store data process") is illustrated in FIG. 4. The merchant web site typically executes the store data process in real-time in response to a change of data in a customer's account or to the creation of a new customer account.

The store data process receives update information (block 420). The update information may include new customers to be added to the customer database as well as updates to existing customer information, such as shipment information, payment information, credit card information, email address, and so forth. Proceeding to the next state, the store data process stores the update information in the customer database (block 430) and sends an update message to the customer cache 327 (block 440). The update message notifies the customer cache 327 that the customer database 324 has been modified and that the customer cache 327 may need to be updated as well. In one embodiment, the update message may include the update information, whereas, in other embodiments, the update message may include a code instructing the customer cache 327 to perform a read from the customer database 324.

Proceeding to the next state, the store data process receives the update message in the customer cache 327 (block 450) and stores the update information in the customer cache 327 (block 460). As previously discussed, the customer cache 327 may perform a read from the customer database 324 to retrieve the update information, or the update information may be included in the update message.

While one embodiment of a store data process is illustrated in FIG. 4, it is recognized that other embodiments may be used. For example, the update message may be sent to the customer database 324 and the customer cache 327 at the same time. Further, the customer database 324 and/or the customer cache 327 may queue the update messages before storing them.

B. Retrieve Customer Data Process

Figure 5:
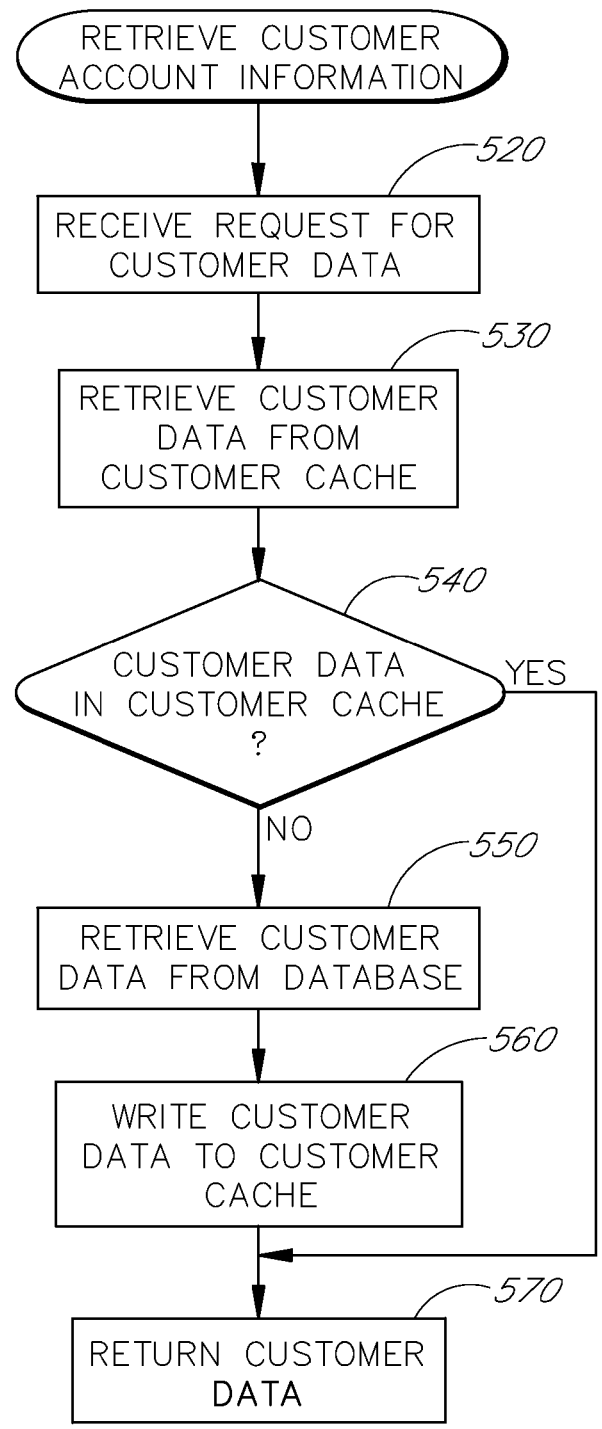
FIG. 5 illustrates a flow diagram of one embodiment of a retrieve customer account information process.

One embodiment of a retrieve customer data process ("retrieve data process") is illustrated in FIG. 5. The merchant web site 320 typically executes the retrieve data process in real-time in response to a request for customer account information. The retrieve data process receives a request for customer data (block 520). Proceeding to the next state, the retrieve data process retrieves the customer data from the customer cache 327 (block 530). If the customer data is not in the customer cache 327 (block 540), the retrieve data process retrieves the customer data from the customer database 324 (block 550) and stores a copy of the customer data in the customer cache 327 (block 560). In other embodiments, after retrieving the customer data from the customer database 324, the retrieve data process may send an update message to the customer cache 327 along with the customer data or instructions to have the customer cache 327 retrieve the customer data. Next, the retrieve data process returns the customer data (block 570). If the customer data is found in the customer cache 327, then the retrieve data process returns the customer data (block 570).

While one embodiment of a retrieve data process is illustrated in FIG. 5, it is recognized that other embodiments may be used. For example, the customer data may be sent to the customer cache 327 and stored for a later update. In addition, the customer data may be processed and/or formatted before it is returned. Further, the data may be retrieved from the customer database 324 without querying the customer cache 327.

C. Presentation Process

Figure 6:
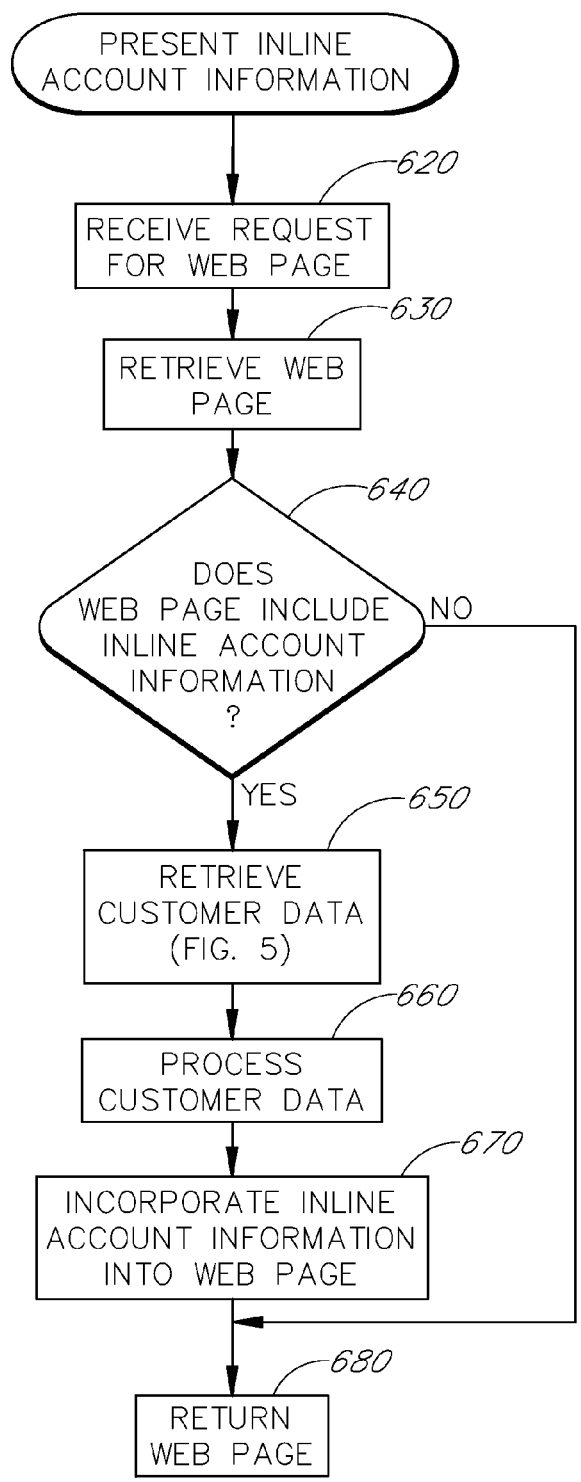
FIG. 6 illustrates a flow diagram of one embodiment of an inline account presentation process.

One embodiment of a presentation process that provides inline account information in a web page is illustrated in FIG. 6. The presentation process is typically executed by the merchant web site 320 in real-time in response to a request for a web page. The presentation process receives a request for a web page (block 620). Proceeding to the next state, the presentation process retrieves the requested web page (block 630) from, for example, the database of web documents 322. It is recognized that various types of web pages or electronic documents may be used such as email, video messages, and so forth.

Proceeding to the next state, the presentation process determines whether the web page includes inline account information (block 640). In one embodiment, the type of web page requested and/or the section of the merchant web site from which the request was made determines whether inline account information may be included, as well as the type of information that may be included in the web page. The type of inline account information included may be based upon the customer and the recent order information (e.g., unrecognized customer, recognized customer with recent order and no shipments, recognized customer with recent order with pending shipments, etc.). As noted above, the attached appendix illustrates the types of inline account information and customized Help information displayed in various situations according to one embodiment of the invention. Rules specifying whether to include inline account information and what information to include may be incorporated into the web site code 328 that generates the web pages, and/or into the coding of the web pages themselves.

If inline account information is included, the presentation process retrieves the corresponding customer data (block 650) from the customer database 324 and/or the customer cache 327. One embodiment of a process for retrieving customer data is illustrated in FIG. 5 and is discussed above. Proceeding to the next state, the presentation process processes the customer data (block 660). The processing may include determining which data should be presented in the web page, formatting the data, determining whether or not there is a high enough level of confidence that the requesting party has permission to access such data, and so forth. In one embodiment, the type of web page requested and/or the section of the merchant web site from which the request was made determines how the data should be formatted.

It is also recognized that in some embodiments, rather than displaying the inline account information with the product description, a link may be provided to the related account information stating, for example, "Click here to view the status of your order for this product." In addition, it is recognized that other types of web page display methods may be used and that the information may be displayed in a variety of formats. Further, in systems that provide a voice interface, the inline account information may be presented audibly using synthesized or prerecorded voice.

Proceeding to the next state, the presentation process incorporates the processed customer data as inline account information into the web page (block 670) and returns the web page (block 680). If the web page does not include inline account information, the presentation process just returns the web page (block 680).

While one embodiment of a presentation process is illustrated in FIG. 6, it is recognized that other embodiments may be used. For example, the web page may not be retrieved until after the customer data has been retrieved. In addition, the request for the web page may include a code that alerts the presentation process as to whether or not customer data needs to be retrieved. Further, the inline account information may be incorporated into a separate electronic document that is associated with the web page, such as a popup window.

V. Types of Inline Account Information

As will be apparent from the foregoing, a variety of types of context-sensitive, account-specific information may also be incorporated into product detail pages (and other types of pages) using the methods set forth above.

For example, as indicated above, the product detail pages may also be supplemented with information about a customer's prior orders of "related" products. In one embodiment, this is accomplished by maintaining a table of products that are related. When a customer accesses a product detail page, the customer's order history and the related products table are accessed to determine whether the customer has previously purchased one or more related products. If any such previous purchases were made, the detail page is supplemented with an appropriate message notifying the customer of each such order (and optionally its status). As mentioned above, the display of orders of related products may be made contingent upon whether any orders have been placed for the displayed product itself.

In one embodiment, the related products table is generated automatically by periodically analyzing browsing histories of customers to identify products that are frequently viewed during the same browsing session. For example, products A and B may be deemed related because a large percentage of users who viewed A also viewed B during the same session. An important attribute of this method is that the related products reflected in the table tend to be substitutes (because customers tend to view like or substitute products during individual browsing sessions). Thus, customers are notified before potentially making unnecessary purchases. Example methods for identifying related products using product viewing histories are described in U.S. application Ser. No. 09/821,712, filed Mar. 29, 2001 and titled "USE OF PRODUCT VIEWING HISTORIES TO IDENTIFY RELATED PRODUCTS," the disclosure of which is hereby incorporated by reference. The task of identifying related products may alternatively be performed using other sources of information, such as product descriptions and/or product classifications.

Another type of inline account information that may be displayed is information about whether the viewed product is compatible with a related product previously purchased by the customer. For instance, if a customer purchases a Kodak digital camera that uses CompactFlash memory cards, and thereafter views the detail page of a non-CompactFlash memory card, a warning message may be displayed such as "Please note that this memory card does not work with the Kodak camera you recently purchased." Before displaying such a message, the system may first confirm that the customer has not purchased another device which does use the displayed memory card. Information about incompatibilities may be maintained in the products database, a product compatibility table, the coding of the product detail pages, or another type of data repository.

In addition, the displayed inline account information may include information associated with the accounts of affiliated customers. For example, a product detail page may be customized to indicate that the displayed product is on a wish list of an affiliated customer. As indicated above, the affiliation may be explicit (e.g., Customer A explicitly added Customer B to a list of "friends") or implicit (e.g., Customer A purchased a gift or a gift certificate for Customer B).

Further, in embodiments in which the online merchant has established partnerships with physical stores, the displayed information may include information pertaining to such stores. For instance, if the online merchant provides an option for customers to pick up purchased items from local, physical stores, information about the delivery or pick up status of such items may be incorporated into the online merchant's web pages associated with such items. The following are examples of the types of personalized messages that may be displayed in such embodiments: "You ordered this product from us last Friday, and it is currently available for pick up at ABC Store on Elm Street;" "This item is currently in stock at ABC Store on Elm Street in your city of residence—would you like to reserve it?" To implement this feature, the inventory and order databases of the various merchants may be linked using methods that are well known in the art.

The inline account information may also include alerts to notify the customer that an order needs attention. The alert may occur, for example, if a customer's credit card payment did not clear, an ordered product has been recalled or discontinued, an estimated shipping date has been delayed, and so forth. These alerts may be presented to the customer in various web pages of the customer's browsing session.

VI. Conclusion

Although this invention has been described in terms of certain embodiments and applications, other embodiments and applications that are apparent to those of ordinary skill in the art, including embodiments which do not provide all of the features and advantages set forth herein, are also within the scope of this invention. Accordingly, the scope of the present invention defined only by reference to the appended claims.

APPENDIX

| Customer Level | Order Level | Shipping Level | Information Displayed |
| --- | --- | --- | --- |
| Unrecognized Customer | N/A | N/A | Account Features<br>Subscribe/Unsubscribe<br>Link to Where's my Stuff<br>Password Assistance<br>Links to Help Pages<br>How to Order<br>How to Redeem a Gift Certificate<br>How to Return an Item/Policy |

APPENDIX-continued

| Customer Level | Order Level | Shipping Level | Information Displayed |
|---|---|---|---|
| Recognized Customer | No Recent Orders | N/A | Personalized Greeting<br>Account Features<br>Subscribe/Unsubscribe<br>Link to Where's my stuff<br>password Assistance<br>Address Book<br>1-Click Settings<br>Credit Card Edit<br>Links to Help Pages<br>How to Redeem a Gift Certificate<br>How to Return an Item/Policy |
| Recognized Customer | Recent Order | No Shipment(s) | Personalized Greeting<br>Account Features<br>Subscribe/Unsubscribe<br>Link to Where's my stuff<br>Password Assistance<br>Address Book<br>1-Click Settings<br>Credit Card Edit<br>Order Information<br>Estimated Delivery Date<br>Cancel Button<br>Order Edit Features<br>Links to Help Pages<br>How to Redeem a Gift Certificate<br>How to Return an Item/Policy |
| Recognized Customer | Recent Order | Pending Shipment(s) | Personalized Greeting<br>Account Features<br>Subscribe/Unsubscribe<br>Link to Where's my stuff<br>Password Assistance<br>Address Book<br>1-Click Settings<br>Credit Card Edit<br>Order Information<br>Estimated Delivery Date<br>Links to Help Pages<br>How to Redeem a Gift Certificate<br>How to Return an Item/Policy |
| Recognized Customer | Recent Order | Pending Spilt Shipment(s) | Personalized Greeting<br>Account Features<br>Subscribe/Unsubscribe<br>Link to Where's my stuff<br>Password Assistance<br>Address Book<br>1-Click Settings<br>Credit Card Edit<br>Order Information<br>Estimated Delivery Date<br>Order Edit Features for remaining items<br>Links to Help Pages<br>How to Redeem a Gift Certificate<br>How to Return an Item/Policy |
| Recognized Customer | Recent Order | Pending Shipment(s) and Recently Completed Shipment(s) | Personalized Greeting<br>Account Features<br>Subscribe/Unsubscribe<br>Link to Where's my stuff<br>password Assistance<br>Address Book<br>1-Click Settings<br>Credit Card Edit<br>Order Information<br>Estimated Delivery Date<br>Actual Delivery Date<br>Order Edit Features for Remaining Items<br>Links to Help Pages<br>How to Redeem a Gift Certificate<br>How to Return an Item/Policy |
| Recognized Customer | Recent Order | Recently Completed Shipment(s) | Personalized Greeting<br>Account Features<br>Subscribe/Unsubscribe<br>Link to Where's my stuff<br>password Assistance<br>Address Book<br>1-Click Settings<br>Credit Card Edit |

APPENDIX-continued

| Customer Level | Order Level | Shipping Level | Information Displayed |
|---|---|---|---|
| | | | Order Information |
| | | | Actual Delivery Date |
| | | | Links to Help Pages |
| | | | How to Redeem a Gift Certificate |
| | | | How to Return an Item/Policy |

What is claimed is:

1. A method of providing contextual information to customers on pages of an electronic catalog, the method comprising:
   receiving, from a computing device associated with a customer, a request for an item detail page of an electronic catalog, said item detail page corresponding to a first catalog item, and providing functionality for selecting the first catalog item for purchase;
   determining, in response to the request, that the customer previously placed an order for a second catalog item that is related to the first catalog item;
   supplementing the item detail page with information reflective of the previously placed order, said information including an identification of the second catalog item; and
   sending the item detail page, as supplemented with the information reflective of the previously placed order, to the computing device in response to the request;
   wherein the method is performed by a system that comprises one or more servers.

2. The method of claim 1, wherein the information reflective of the previously placed order comprises an indication of whether the first catalog item is interoperable with the second catalog item.

3. The method of claim 2, wherein the first and second catalog items are electronics products.

4. The method of claim 1, wherein the information reflective of the previously placed order comprises an indication of whether the first catalog item is compatible with the second catalog item.

5. The method of claim 1, wherein the information reflective of the previously placed order comprises an indication that the first catalog item is not compatible with the second catalog item.

6. The method of claim 5, wherein the indication that the first catalog item is not compatible with the second catalog item is included on the item detail page in response to a determination by said system that the customer has not purchased a catalog item that is compatible with the first catalog item.

7. The method of claim 5, wherein the method comprises accessing a data repository of information regarding item incompatibilities to determine whether the first and second items are incompatible.

8. The method of claim 1, wherein the information reflective of the previously placed order comprises a date on which the customer placed said order.

9. The method of claim 1, wherein the method comprises, in response to the request, accessing item relationship data to identify a plurality of related catalog items that are related to the first catalog item, and accessing order data of the customer to determine whether the customer has ordered any of said related catalog items.

10. The method of claim 1, wherein the method comprises accessing cached customer data to determine whether the customer has placed an order for a catalog item that is related to the first catalog item.

11. An interactive system, comprising:
    a computing system that provides user access to an electronic catalog of items, said electronic catalog comprising item detail pages that correspond to particular items, said item detail pages providing functionality for selecting corresponding items for purchase, said computing system comprising one or more servers;
    a data repository that stores customer-specific order information regarding orders placed by computers for particular items represented in the electronic catalog; and
    a data repository that stores item relationship data identifying particular items that are related to each other;
    said computing system programmed to respond to a request, from a computing device associated with a customer, for an item detail page corresponding to a first item by at least (a) using said order information and item relationship data to determine whether the customer previously placed an order for a second item that is related to the first item, and (b) when such a previously placed order is identified, supplementing the item detail page with information reflective of said order, said information identifying the second item.

12. The interactive system of claim 11, wherein the computing system is additionally programmed to access item incompatibility information to determine whether the first and second items are incompatible with each other, and when the first and second items are determined to be incompatible, to supplement the item detail page with an indication that the first and second items are incompatible.

13. The interactive system of claim 11, wherein the information reflective of the previously placed order comprises an indication that the first and second items are incompatible with each other.

14. The interactive system of claim 13, wherein the computing system is programmed to supplement the item detail page with said indication in response to determining that the customer has not purchased an item that is compatible with the first item.

15. The interactive system of claim 11, wherein the information reflective of the previously placed order comprises an indication of whether the first and second items are interoperable with each other.

16. The interactive system of claim 11, wherein the information reflective of the previously placed order comprises a date on which the customer placed said order.

17. The interactive system of claim 11, wherein the computing system is operative to respond to the request by accessing the item relationship data to identify a plurality of related items that are related to the first item, and to use the order information to determine whether the customer has ordered any of said related items.

18. The interactive system of claim 11, wherein the computing system is programmed to cache order history information associated with said customer during a browsing session of the customer, and to access the cached order history information during the browsing session to determine whether the customer has ordered any items that are related to those selected for viewing during the session.

* * * * *